US009470158B2

United States Patent
Deshmukh (10) Patent No.: US 9,470,158 B2
(45) Date of Patent: Oct. 18, 2016

(54) VEHICLE WITH DEFINED POWER ON DEMAND

(71) Applicant: DEERE & COMPANY, Moline, IL (US)

(72) Inventor: Vinesh Y. Deshmukh, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/461,691

(22) Filed: Aug. 18, 2014

(65) Prior Publication Data

US 2016/0047321 A1 Feb. 18, 2016

(51) Int. Cl.
*G06F 7/00* (2006.01)
*F02D 29/02* (2006.01)
*B60K 25/00* (2006.01)
*B60W 50/00* (2006.01)
(Continued)

(52) U.S. Cl.
CPC ............... *F02D 29/02* (2013.01); *B60K 25/00* (2013.01); *B60W 50/0098* (2013.01); *B60W 50/085* (2013.01); *B60W 2050/0062* (2013.01); *B60W 2050/146* (2013.01); *B60W 2300/152* (2013.01)

(58) Field of Classification Search
CPC . Y02T 10/7077; Y02T 90/14; Y02T 10/648; Y02T 10/6286; Y02T 10/646; A01D 69/025; A01D 43/105; A01D 41/127; B60L 2200/26; B60L 2200/40; B60L 11/1801; B60Y 2200/222; B60Y 2200/41; G08C 17/00
USPC ............. 701/36, 50, 69, 99, 490; 180/65.31, 180/68.1, 68.2, 68.3, 69.6; 280/236, 230, 280/223, 215; 340/855.8, 539.3, 693.1, 340/693.3, 7.32, 7.36, 7.37
See application file for complete search history.

(56) References Cited

U.S. PATENT DOCUMENTS

| 6,600,980 B1 * | 7/2003 | Kraska et al. ......... B60K 6/445 477/2 |
| 7,047,128 B2 | 5/2006 | Dudel et al. |
| 2005/0182553 A1 | 8/2005 | Miller |

(Continued)

FOREIGN PATENT DOCUMENTS

| CN | 202483726 U | 10/2010 |
| CN | 101881949 A | 11/2010 |
| DE | 10044917 A1 | 3/2002 |
| DE | 102012211591 | * 1/2014 |
| DE | 102012211591 A1 | 1/2014 |
| JP | 2012-61898 A | 3/2012 |

OTHER PUBLICATIONS

Heli-Parts Nevada LLC, website publication entitled "Engine Power on Demand", 2012, 1 page.
(Continued)

*Primary Examiner* — Muhammad Shafi
(74) *Attorney, Agent, or Firm* — Lorenz & Kopf, LLP (57) ABSTRACT

An vehicle with defined power on demand including a control system configured to provide to an operator a plurality of selectable features each have selectable options. The defined power on demand utilizes unrealized engine power which is limited by an engine control system for reasons of fuel savings and cost effectiveness. The selectable features include power take off (PTO), mechanical front wheel drive (MFD), front hitch, and rear hitch. Selectable options include a plurality of defined amounts of power delivered by a vehicle engine over a period of time with respect to a selected feature. The defined amount of power is greater than the power at which the engine typically operates as limited by the engine control system. The greater power is provided over a period of time to complete each of the selectable features.

11 Claims, 6 Drawing Sheets

(51) Int. Cl.
*B60W 50/08* (2012.01)
*B60W 50/14* (2012.01)

(56) References Cited

U.S. PATENT DOCUMENTS

| | | | | |
|---|---|---|---|---|
| 2009/0198403 | A1* | 8/2009 | Yurgil | F02B 77/081 |
| | | | | 701/33.7 |
| 2011/0118858 | A1 | 5/2011 | Rottler et al. | |
| 2013/0289832 | A1 | 10/2013 | Pirotais | |
| 2014/0055064 | A1* | 2/2014 | Ng | H02P 6/182 |
| | | | | 318/400.11 |
| 2014/0058637 | A1 | 2/2014 | Martin et al. | |
| 2014/0121931 | A1 | 5/2014 | Kellum | |

OTHER PUBLICATIONS

Motoren Technik Mayer GmbH, (MTM), website publication entitled "MTM Engine Modifications", 2013, 2 pgs.
P & P Auto Services, website publication entitled "Chip Tuning Remapping", 2013, 2 pgs.
Engine Tuning—the best car engine upgrade, website publication entitled "Car Engine Upgrade", 2013, 3 pgs.
European Patent Office, Extended European Search Report in Application No. 15180615.5 dated Feb. 26, 2016.
Securapoint Security Solutions, Feature-request: Klartextanzeige Lizenzlaufzeit/ Benutzer, Support Forum, p. 3PP, XP002754139, Jan. 24, 2012.

* cited by examiner

VEHICLE WITH DEFINED POWER ON DEMAND

FIELD OF THE DISCLOSURE

The present invention generally relates to a control system for a vehicle having a prime mover to provide power, and more particularly to a control system configured to adjust an amount of power generated by the prime mover in response to a request by an operator for power to be generated by the vehicle.

BACKGROUND

Agricultural equipment, such as a tractor or a self-propelled combine-harvester, includes a prime mover which generates power to perform work. In the case of a tractor, for instance, the prime mover is often a diesel engine that generates power from a supply of diesel fuel. The diesel engine drives a transmission which moves wheels or treads to propel the tractor across a field. In addition to providing power to wheels through a transmission, tractors often include a power takeoff (PTO) which includes a shaft coupled to the transmission and driven by the engine.

The PTO can be coupled to a number of different types of equipment. Examples of such equipment include but are not limited to, log splitters, pumps, concrete mixers, mulchers, chippers, balers, harvesters, spreaders, and sprayers. Agricultural equipment also includes what is known as farm implements or attachments. In addition to the PTO, some tractors include a hydraulic machine having a hydraulic pump which can be used, for instance, to raise or lower a piece of equipment such as a mower.

In addition to agricultural vehicles, other work vehicles having prime movers include construction vehicles, forestry vehicles, lawn maintenance vehicles, as well as on-road vehicles such as those used to plow snow, spread salt, or vehicles with towing capability. While each of the work vehicles, including the agricultural equipment described above, often include combustion engines as the prime mover, some vehicles have electric motors, including stepper or DC motors, as prime movers. In addition, many work vehicles are configured to drive included apparatus such as hitch motion control.

The amount of power provided by the prime mover is limited by the power rating of the prime mover or by a control system which limits the amount of power which the prime mover provides, even though the prime mover may be capable of providing more power than that set by the control system. Some vehicle manufacturers, in fact, will use the same prime mover in a variety of different types of vehicles where the control system is configured to limit the prime mover's power output to different amounts depending on the functions being performed by the vehicle. For instance, while the prime mover may be capable of providing additional power, the operation of compatible accessories or equipment may suffer if too much power is provided to that equipment. Consequently, the power generated by the prime mover may not be limited by the actual power output of the prime mover, but instead may be limited by the control system to insure proper and long lived operation of the accessories or equipment.

While a vehicle's maximum power output is often limited by the control system, in some situations, the operator may desire to perform certain operations more quickly or with more power than what is allowed by the control system. Consequently, even though the prime mover can be capable of generating additional power, the additional power is unavailable. The operator, therefore, is not able to utilize all of the prime mover's power when needed, even if only needed for a short period of time. Consequently, what is needed therefore is a vehicle which can utilize all of a prime mover's power when desired by an operator.

SUMMARY

In one embodiment of the disclosure, there is provided a control system for a vehicle having a prime mover configured to supply power for driving a ground engaging traction device and a powered accessory. The control system includes a user interface including a plurality of user interface buttons and control circuitry operatively connected to the user interface and configured to control the power supplied by the prime mover. Communication circuitry is operatively connected to the control circuitry and is configured to transfer a software component from a software library having a plurality of software components configured to adjust the power supplied by the prime mover. Storage (memory) is operatively connected to the control circuitry and is configured to store the transferred software component, wherein the control circuitry is configured to access the downloaded software component to adjust the power being supplied by the prime mover.

In another embodiment of the disclosure, there is provided a method for adjusting an amount of power being supplied by a vehicle prime mover to one or more vehicle components or accessories. The method includes: receiving through a user interface a selection of an amount of power to be supplied by the prime mover; transmitting a signal responsive to the received amount of power to be supplied, the signal being configured to identify a software component from a software library, the identified software component configured to control the amount of power to be supplied by the prime mover; transferring the identified software component from the software component; storing the received software component to a storage located on the vehicle; and adjusting the amount of power being supplied by the prime mover based on the stored software component.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
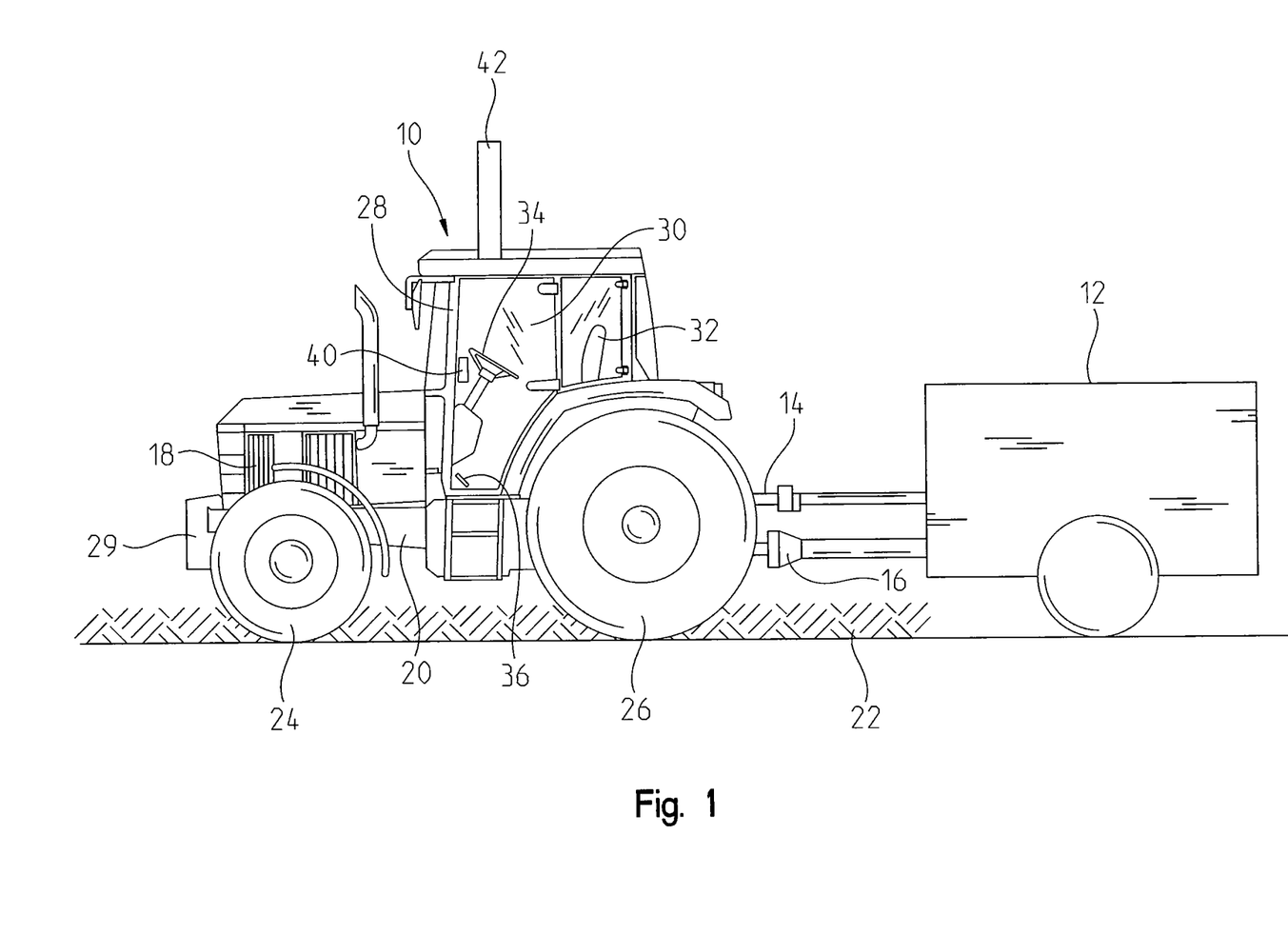
FIG. 1 is a side elevational view of a tractor coupled to farm implement.

FIG. 1 is a side elevational view of a tractor 10 coupled to a farm implement 12, such as a dump trailer, through a drawbar 14 and through a power take off (PTO) 16. The power takeoff 16 rotates about an axis under powered control of an engine 18 located in the tractor 10 as would be understood by one skilled in the art. The tractor 10 includes a frame 20 which supports the engine 18 and which is supported on a ground 22 by steerable front wheels 24 and movable rear wheels 26. In the illustrated embodiment, a transmission 27 (see FIG. 2) is coupled an output of the engine and to the rear wheels to propel the tractor along the ground 22. The PTO 16 is provided as an output of the transmission and moves in response to the power generated by the engine 18. The tractor 10 also includes a hydraulic machine 29 which includes a hydraulic pump configured to move accessories or farm implements coupled to the tractor. In one embodiment, for instance, the hydraulic machine is operatively connected to a mower, the position of which is adjustable, such as being raised or lowered with respect to the ground 22.

A cabin 28 defines an operator workstation 30 and is supported by the frame 20. The cabin 28 encloses a seat 32, a steering wheel 34, a fuel pedal 36, and additional pedals for a brake and a clutch (not shown). A user interface 40 is disposed in the cabin 28 at a location accessible to the operator when seated in seat 32. The user interface 40 includes a plurality of operator selectable buttons configured to enable the operator to control the operation and function of the tractor 10 and the farm implement 12. The user interface 40, in one embodiment, includes a user interface screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons. A communication antenna 42 is supported by the cabin 28 and provides for the transmission and receipt of signals transmitted though air.

Figure 2:
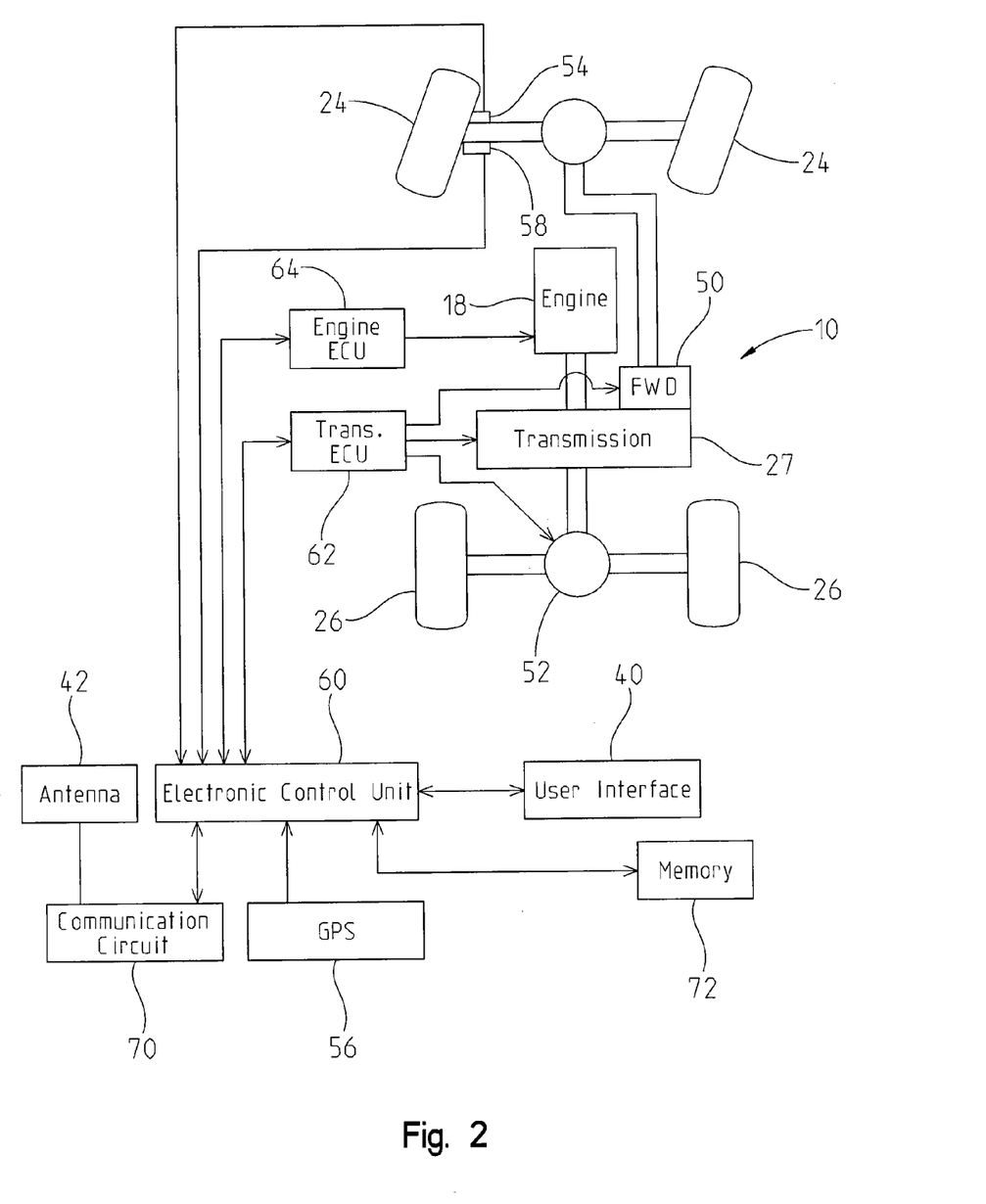
FIG. 2 is a simplified schematic diagram of a vehicle and a control system embodying the invention.

FIG. 2 is a simplified schematic diagram of the vehicle 10 and a control system embodying the invention. The transmission 27 includes an electronically controlled front wheel drive control unit 50 and an electronically controlled differential lock control unit 52. The front wheel drive control unit 50 is coupled to the steerable front wheels 24. When the front wheel drive control unit 50 is on, torque is transmitted from the transmission 27 to the front wheels 24. When the front wheel drive control unit 50 is off, torque is not transmitted from the transmission to the front wheels 24.

The differential lock control unit 52 is coupled to the driven rear wheels 26. When the differential lock control unit 52 is unlocked (off, open differential), it allows each of the rear wheels 26 to rotate at different speeds, such as when negotiating a turn. By contrast, when the differential lock control unit 52 is on or locked, it forces both left and right wheels on the same axle to rotate at the same speed under nearly all circumstances.

A wheel angle sensor 54 senses the angular position of the wheels 24. A GPS unit 56 provides a vehicle position signal. A wheel speed sensor 58 provides a wheel speed signal.

A main electronic control unit (ECU) 60 is connected to the wheel angle sensor 54, the GPS unit 56 and the wheel speed sensor 58. The ECU 60 communicates with a transmission ECU 62 and with an engine ECU 64.

Transmission ECU 62 controls the transmission 27 and provides control signals to the front wheel drive control unit 50 and to the differential lock control unit 52. The engine ECU 64 controls the engine 18. The user interface 40 is connected to the main ECU 60. The GPS unit 56 is a conventional GPS unit. In one embodiment, the GPS unit 56 is configured to locate the position of the tractor 10 within the field 22.

A communication circuit 70 is coupled to the ECU 60 and to the antenna 42. The communication circuit 70 is configured to transmit signals generated by the ECU 60, which in some applications have been generated in response to information submitted by an operator through the user interface 40. The communication circuit 70 is further configured to receive signals from the antenna 42. A memory 72 is operatively coupled to the ECU 60 and is configured to store information. In some embodiments, the communication circuit 70 is used for internal communication among devices or circuits located in the vehicle.

The ECU 60, in different embodiments, includes a computer, computer system, or programmable device, e.g., multi-user or single-user computers. In other embodiments, the ECU 60 can include one or more processors (e.g. microprocessors), and the associated internal memory including random access memory (RAM) devices comprising the memory storage of the ECU 60, as well as any supplemental levels of memory, e.g., cache memories, non-volatile or backup memories (e.g. programmable or flash memories), read-only memories, etc. In addition, the memory can include a memory storage physically located elsewhere from the processing devices and can include any cache memory in a processing device, as well as any storage capacity used as a virtual memory, e.g., as stored on a mass storage device or another computer coupled to ECU 60 view the communication circuit 70. The mass storage device can include a cache or other dataspace which can include databases. In addition to internal memory, a memory 72 is operatively coupled to the ECU 60 and is configured to store information. Each of the transmission ECU 62 and engine ECU 64, in different embodiments, include the above described components and features.

Figure 3:
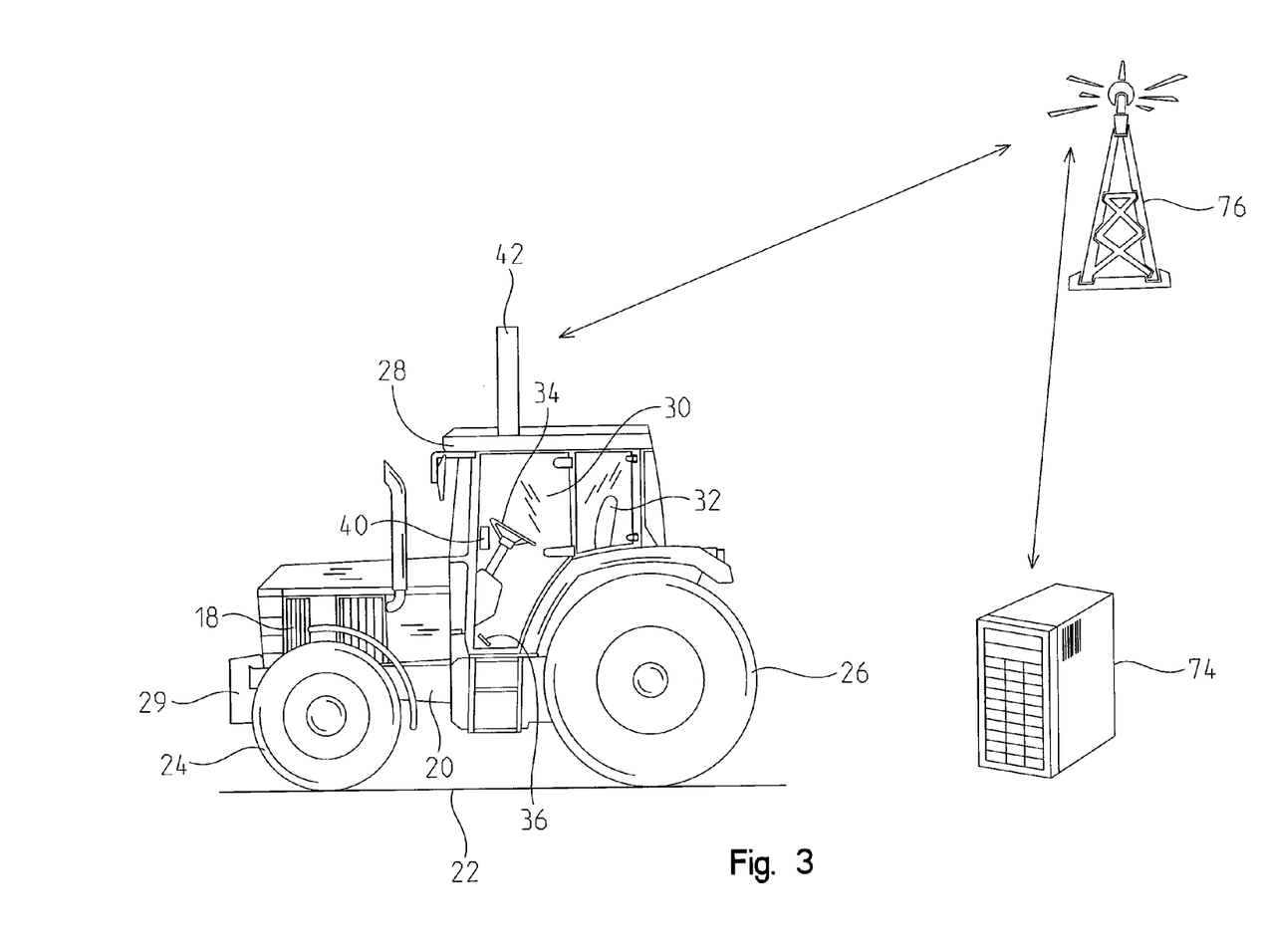
FIG. 3 is a simplified schematic diagram of a tractor configured to communicate with a server through a communication tower.

FIG. 3 is a simplified schematic diagram of the tractor 10 including the antenna 42 configured to communicate with a server 74 through a communication tower 76. The server 74 is disposed at a location distant from the tractor 10, such that the tractor 10 communicates wirelessly with the server 74 through the communication tower 76. Communication tower 76, in different embodiments, represents wireless communication facilitated by a satellite, a cell phone tower, a microwave tower, a 3G or 4G tower, and radios. Other means of wireless communication are possible. In different embodiments, the server 74 is located at a facility maintained by the manufacturer of the tractor, a manufacturer of the ECU 60, or a server facility maintained by a third party where the facility includes a plurality of servers serving unassociated users, often called "cloud" computing facilities.

As described above, many agricultural vehicles include an engine whose power capability is not fully utilized. In some vehicles, the engine's power output is limited by the control system because the vehicle's construction, such as the frame, may be insufficient to withstand the amount of power capable of being delivered by the engine over a period of time. In other vehicles, the construction of the vehicle may be specifically designed to reach a certain price point such that vehicles of different types may have the same engine but have different capabilities.

For some operations, however, the vehicle's operator requires increased power for a certain period of time to accomplish a certain task. For instance, while the engine power is limited by the control system for routine operations, such as plowing a field to conserve fuel, the operator may desire to increase the amount of power when using a water pump to drain a field. In this situation, the operator is not able to utilize the unrealized engine power to perform the draining operation more quickly so that the regular field operations can resume more quickly. If the operator is interested in performing some tasks that require increased power, the operator must purchase a costlier higher end vehicle/platform. For other operations, however, the operator may wish to reduce the power output for a period of time. For instance, the operator, wishing to conserve fuel, may reduce the available power output when returning the vehicle from a finished job to overnight storage.

Figure 4:
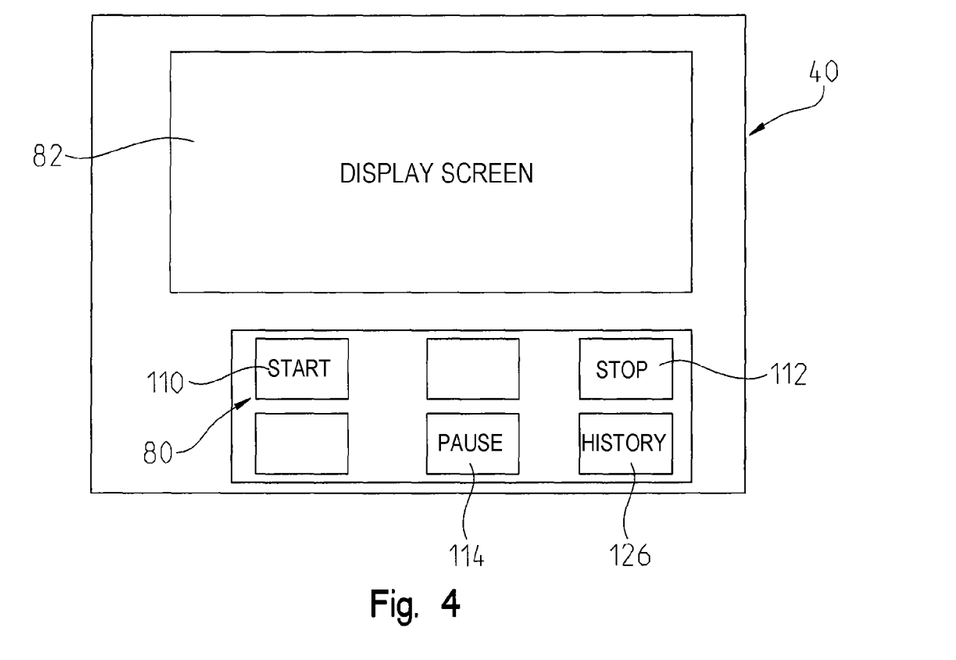
FIG. 4 is a user interface configured to provide an operator access to controllable functions of a vehicle.

To enable an operator to operate a vehicle with increased power, the present disclosure provides for adjusting the amount of power being supplied by a vehicle engine to one or more vehicle components or accessories. The control system includes the electronic control unit 60, the communication circuit 70, the memory 72, and the user interface 40. As illustrated in FIG. 4, the user interface 40 includes a plurality of buttons 80 and a display screen 82. In the illustrated embodiment, the buttons 80 are mechanical switch buttons configured to access a plurality of features and options which are displayed on the display screen 82. In another embodiment, user interface 82 includes a touch screen display such that the functions of the mechanical buttons 80 are displayed on the touch screen 82 as virtual buttons. In another embodiment, the user interface includes a touch screen display for accessing certain functions and options through the virtual buttons, but also includes the mechanical switch buttons for other functions. In different embodiments one or more display screens and touch screen displays are used. In one embodiment, one of the buttons 80 is identified as "Enhance Your Machine" which is configured to start the process of releasing the power available from the engine when requested by the operator.

Figure 5:
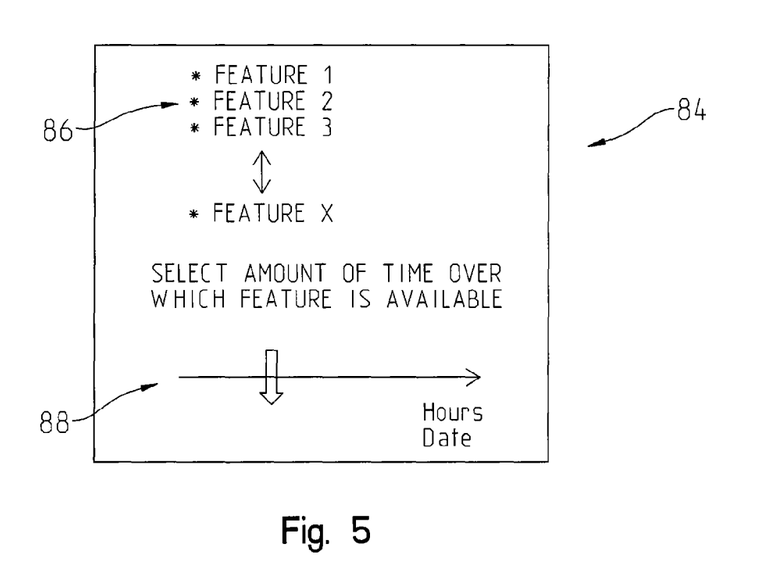
FIG. 5 is a navigable user interface screen configured to display a plurality of features.

FIG. 5 illustrates a navigable user interface screen 84 configured to display a plurality of features 86. Each of the features is selectable by a user through touch contact with the screen 84. In different embodiments, the features include power take off, mechanical front wheel drive (MFD), front hitch, and rear hitch. Other features are possible and are not limited to those recited. Typically, however, each of the features is directed to a particular operation the made available for operator to perform with a particular accessory or implement. For instance, if the operator intends to use the PTO to drive a water pump, "Feature 1" is displayed as "PTO". Upon selection of PTO, the user interface 40 generates a signal which is transmitted to the electronic control unit 60.

The electronic control unit 60 executes or otherwise relies upon computer software applications, components, programs, objects, modules, or data structures, etc. Software routines resident in the included memory of the ECU 60, the memory 72, or server 74 are executed in response to the signal received. The executed software includes one or more specific applications, components, programs, objects, modules or sequence of instructions typically referred to as "program code". The program code includes one or more instructions located in memory and other storage devices which execute the request provided by the operator though the user interface 40.

In one embodiment, each of the features is controlled by program code which is resident at the server 74. Upon selection of the desired feature, the ECU 60 generates a signal to the communication circuit 70 directing the communication circuit 70 to retrieve a piece of software or software package configured to enable the specific feature selected. The server includes a software library including a plurality of software packages or components, each one corresponding to one of the features. One or more of software packages includes a defined engine power which is made available to the operator. For instance, when the PTO feature is selected, the retrieved software package includes an amount of power which can be delivered by the engine when using the PTO, subject to limits defined by the software component. The amount of power is greater than that typically available in the tractor. In some embodiments, the software package includes levels of power which can be delivered by the engine up to the maximum amount.

Figure 6:
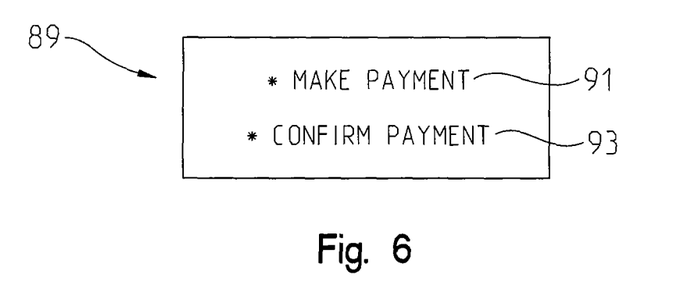
FIG. 6 is a navigable user interface screen configured to display payment options.

The server 74, upon receipt of the selected desired feature, determines whether the operator requesting the change to vehicle power has been authorized to receive the requested software component. The determination of whether the operator is authorized is based on one or more criteria established at the time of vehicle purchase, vehicle leasing, or later as an added enhancement. In different embodiments, the operator is authorized to receive some or all enhancements for a vehicle. The number of available enhancements is determined based on the purchase price or lease price of the vehicle as well as other payments made to access further enhancements once the purchase price or lease price has been paid. After the server has authenticated the request, the user interface 82, as illustrated in FIG. 6, displays a screen 89 requesting one or both of a "Make Payment" option 91 or a "Confirm Payment" option 93. One or both of the options are provided so that the operator confirms payment of, or pays for, the enhanced features at the time of request, depending on the type of payment options available. In some cases, the operator may have an account with the enhancement provider, so that the "Confirm Payment" option is selected and charged to the operator's account. In other cases, however, the operator can make a payment immediately by making a payment through a credit card or debit card transaction. In some embodiments, the system includes an integrated credit card reader. In other embodiments, a communication port is provided in the vehicle to which the operator connects a laptop, mobile device, or computer to enable the payment transaction.

Once payment is confirmed, the transmission of the appropriate software component is enabled. The appropriate software package is located and is downloaded to the memory 72 or internal memory of the ECU 60 through the antenna 42 and the communication circuit, in the case of an external server. The software package, in different embodiment, is transmitted wireless as digital or analog information.

In another embodiment, the software library is stored in a memory on the vehicle and wireless communication with an externally located server is not required. In this embodiment, the communication circuitry may be maintained for other purposes, but transmission circuitry, which may be part of the communication circuitry, is coupled to the user interface. The transmission circuitry transmits a signal to the memory storing the software library to retrieve the desired software component. The desired software component is transmitted to the memory 72 or internal memory 60 for the desired application.

The user interface further displays a time selector 88 embodied as a slide mechanism 90. The slide mechanism 90 includes a time line identified in hours and an arrow which is moved along the time line to select the amount of time over which the selected feature is made available to the operator. For instance, if the operator selects the PTO feature with the intent of driving a water pump, the operator may not know an exact time when the feature is required. It may be that the operator will only be in the field from 8 am to 4 pm that day, but doesn't know at exactly what time the water pump will be used. Consequently, the operator slides the arrow to 8 hours, so that the increased power is available at any time during the 8 hour period. A date selection is also provided such that the operator schedules a day when increased power is available to coincide with the operator's work schedule.

The user interface of FIG. 5 is also used to request a defined engine power immediately. In one embodiment, the date and time are set to the current date and time and the arrow is moved to a time duration to start immediately. In another embodiment, the user interface includes a start button 110 and stop button 112 as described later herein. In this embodiment, however, when the date and time are set to the current date and time, the start button provides for starting the power immediately and the stop button provides for stopping the enhanced power.

Figure 7:
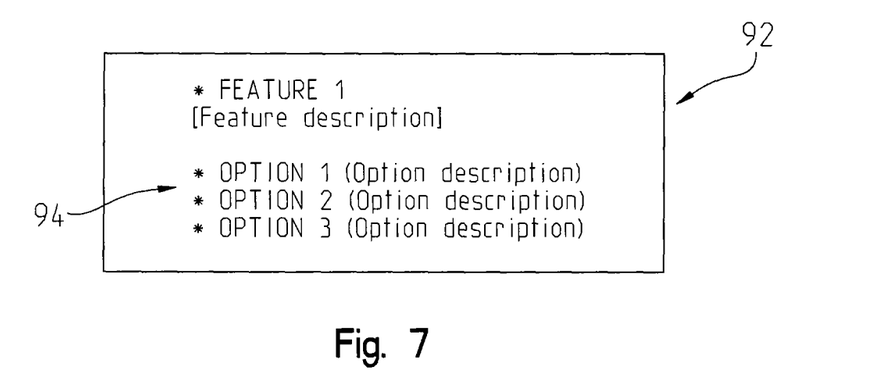
FIG. 7 is a navigable user interface screen configured to display a plurality of options.

FIG. 7 illustrates a navigable user interface screen 92 configured to display a plurality of options 94. Each of the options displayed is directed to a single function previously identified by the operator. In one embodiment, the options displayed for the selected PTO feature include a plurality of rotational speeds of the PTO shaft. For instance, in one embodiment, the options available with the selected PTO feature include 1000 rpm, 1800 rpm, and 2000 rpm. In this and other embodiments, these options of rotational speeds are available upon selection of the front hitch function values. Additionally, turning times are provided for a hitch turning operation. In normal operation, a hitch turning time takes five seconds to turn from one side to the other. In the enhanced mode, options such as three seconds or two seconds of turning times are provided.

The options for each selected feature are identified by the type of option. In the case of selection of a hydraulic lift feature, the available options include a lifting power of 200 newtons, 400 newtons, and 600 newtons are provided. For a bushels processed feature, the options include 25 bushels, 40 bushels, and 50 bushels.

The features and options described herein are not limited to those disclosed and other features and options are within the scope of the present disclosure. Additionally, the number of features and options are not limited to the number disclosed herein and may be more or less that those described. Likewise, the specific values for each of the options are by way of example and are not limited.

Figure 8:
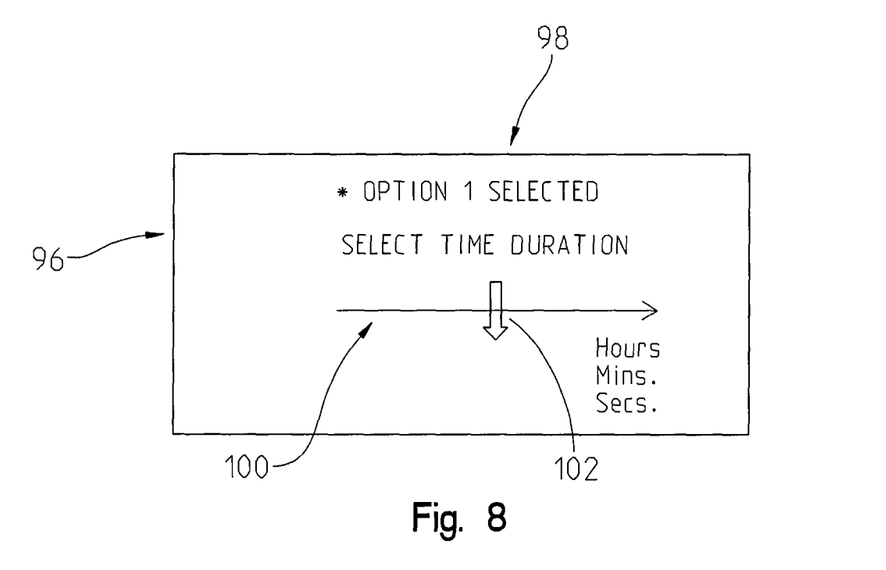
FIG. 8 is a navigable user interface screen configured to display an option selected from a plurality of options.

FIG. 8 is a navigable user interface screen configured to display a user interface screen 96 having an indicator 98, indicative of the option selected, and a slide mechanism 100. In this embodiment, assuming the PTO feature has been selected, the slide mechanism is adjustable to indicate the amount of time over which the selected option is operable. The time line for the selected option, in different embodiments, includes a selectable time corresponding to the feature and option selected. For instance, if the PTO is being used to drive a water pump using a PTO shaft speed of 1000 rpm, the amount of time over which the PTO shaft speed rotates at 1000 rpm is selected by the arrow 102. In this case, the time line includes hours, minutes and seconds which enable a relatively precise control of the option duration.

Figure 9:
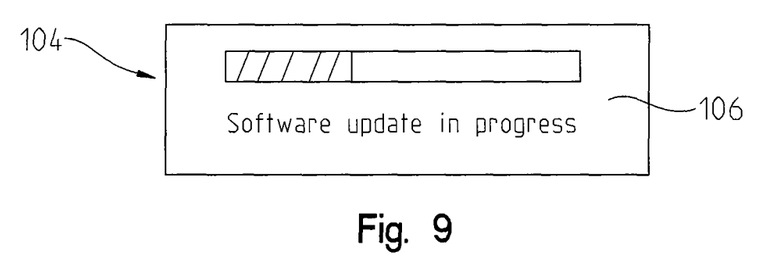
FIG. 9 is a user interface screen configured to display a status indicator.
Figure 10:
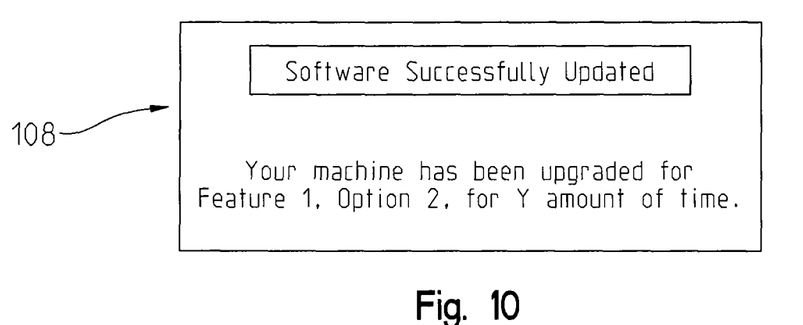
FIG. 10 is a user interface screen configured to display completion of a software update.

FIG. 9 illustrates a user interface screen 104 configured to display a status indicator 106 providing the status of completion of a software update. After or while the operator is making selections of features, options, and time durations, the software is downloaded from the server over a period of time which changes depending on the operational speed of the server 74, the tower 76, the communication circuit 70, and related software and hardware. Once the software update is completed, user interface screen 108 of FIG. 10 indicates that the software has been successfully updated and that the machine has been upgraded for the selected feature for the selected amount of time.

Once the software has been successfully updated, the updated features are available to the operator if the date of use selected corresponds the current date. In the example of increased power of the PTO for driving the water pump, the operator selects a start button 110 of FIG. 4 to begin operating the PTO shaft at the selected 1000 rpm for the amount of time selected through the user interface 96 of FIG. 8. If the operator, however, decides that the selected function should be stopped before the selected amount of time, the operator selects a stop button 112 at the user interface 40 to stop the function. In another embodiment, the user interface includes a pause button 114 configured to pause the selected feature. The feature, once paused, is restarted upon selection of the start button.

Figure 11:
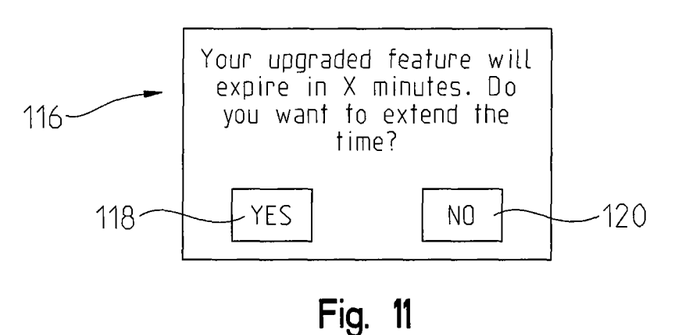
FIG. 11 is a navigable user interface screen configured to display an option to extend time.

Once the amount of time over which the selected feature is available as selected by time selector 88 of FIG. 5 is close to expiring, a user interface screen 116 of FIG. 11 is displayed on the user interface 40 indicating that the selected feature is about to expire. A "Yes" button 118 is displayed and enables the operator to extend the period of time over which the feature is available. A "NO" button 120, if selected by the operator, indicates that the operator is not interested in extending the time. Once the operator indicates that the enhanced features are no longer necessary, the tractor, and in particular the ECU 60, are "downgraded" such that the enhanced features are no longer available until selected again. Once "downgraded", the vehicle is set to operate in the standard operating mode or "normal" mode.

Figure 12:
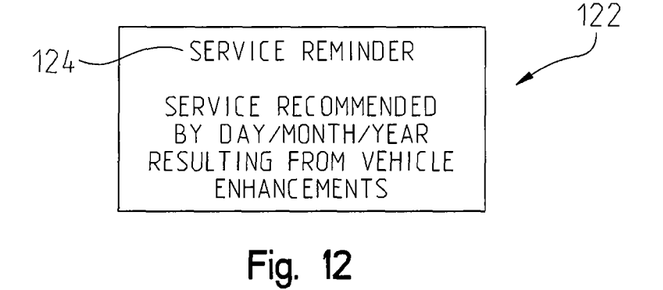
FIG. 12 is a navigable user interface screen configured to display a service reminder.

FIG. 12 is a navigable user interface screen 122 configured to display a service reminder 124. While maintenance and service interval calculations are typically based on a predicted amount of use during the normal operation of a vehicle, in the described embodiments, additional wear and tear can result from the enhanced features. To accommodate for the additional wear and tear, each of the requested and used enhanced features are recorded either by the electronic control unit 60 or the server 74. The recorded requested features are used to determine whether the maintenance and service intervals should be revised. For example, if a vehicle is enhanced for forty hours a month, service may be required in two months. If the vehicle is enhanced for 150 hours a month, service may be required in one month. Once the system determines a new service date, the service reminder screen 124 displays the need for a service reminder and a recommended date of service. In one embodiment, the service reminder screen 124 is displayed as a small reminder icon appearing in the display 82 of FIG. 4. In addition, the interface buttons 80 include a service history button 126, which when selected provides to the operator a history of enhanced features including dates and times and previous maintenance or service made to the vehicle.

The disclosed user interface screens, in different embodiments, are displayed on one or more display screens available to the operator. In some situations, multiple display screens may prove advantageous where the location of the display enables the operator to watch the selected feature being performed. In addition, while the disclosure provides for a particular organization of the features and options being displayed, in other embodiment, different combinations of features, options and other control functions are arranged differently.

While exemplary embodiments incorporating the principles of the present invention have been disclosed hereinabove, the present invention is not limited to the disclosed embodiments. Instead, this application is intended to cover any variations, uses, or adaptations of the invention using its general principles. For instance, other features are included such as a sprayer utilized for pesticides or fertilizer. In this application, the options include liters of pesticides sprayed. In addition, the disclosed embodiments apply to both purchased vehicles as well as rented or leased vehicles. In the case of a rented or leased vehicle, the selection of the enhanced mode of operation is recorded, through communication with the server, and the enhanced mode is billed to the operator accordingly. Further, this application is intended to cover such departures from the present disclosure as come within known or customary practice in the art to which this invention pertains.

The invention claimed is:

1. A method for adjusting an amount of power being supplied by a vehicle prime mover to one or more vehicle components or accessories, the method comprising:
    receiving, by an electronic control unit a selection from a user interface of an amount of power to be supplied by the prime mover;
    transmitting, by the electronic control unit, a signal responsive to the received amount of power to be supplied, the signal being configured to identify a software component from a software library, the identified software component configured to control the amount of power to be supplied by the prime mover;
    transferring, by communication circuitry, the identified software component from the software library;
    storing the received software component to a storage device located on the vehicle; and
    adjusting, by the electronic control unit, the amount of power being supplied by the prime mover based on the stored software component in order to operate the vehicle with increased or decreased power.

2. The method of claim 1 further comprising receiving, by the electronic control unit a period of time from the user interface, wherein the period of time determines the amount of time over which the adjusted amount of power is available.

3. The method of claim 2 further comprising receiving, by the electronic control unit, a feature from the user interface selected from a plurality of features, wherein the plurality of features includes a power take off, a hydraulic pump, and a mechanical front wheel drive.

4. The method of claim 2 further comprising receiving, by the electronic control unit, an option from the user interface corresponding to one of the plurality of features, wherein the received option determines an operational parameter of the corresponding one of the plurality of features.

5. The method of claim 4 wherein the received option corresponding to the power takeoff includes revolutions per minute of the power takeoff.

6. The method of claim 4 wherein the received option corresponding to the mechanical front wheel drive corresponds to a turning time.

7. The method of claim 4 wherein the received option corresponding to the hydraulic pump corresponds to a lifting power.

8. The method of claim 4 further comprising displaying, by the user interface, a status of storing of the received software component.

9. The method of claim 8 further comprising displaying, by the user interface, a period of time over which the selected one of the plurality of features is available for use.

10. The method of claim 9 further comprising displaying, by the user interface, an indicator configured to indicate an amount of time remaining of the period of time.

11. The method of claim 10 further comprising displaying, by the user interface, an extension of time indicator configured to extend the period of time.

* * * * *